(12) United States Patent
Shin

(10) Patent No.: US 7,583,955 B2
(45) Date of Patent: Sep. 1, 2009

(54) SYSTEM FOR AND METHOD OF REPRODUCING MULTIMEDIA CONTENTS IN MOBILE COMMUNICATION TERMINAL

(75) Inventor: Changho Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 993 days.

(21) Appl. No.: 10/897,518

(22) Filed: Jul. 23, 2004

(65) Prior Publication Data

US 2006/0234684 A1 Oct. 19, 2006

(30) Foreign Application Priority Data

Jul. 24, 2003 (KR) .................. 10-2003-0051054
Nov. 7, 2003 (KR) .................. 10-2003-0078582

(51) Int. Cl.
*H04M 3/42* (2006.01)

(52) U.S. Cl. .................... 455/414.1; 386/12; 386/13; 386/66; 386/84; 386/95; 348/423.1

(58) Field of Classification Search ........... 455/414.1; 386/12, 13, 66, 84, 95; 348/423.1
See application file for complete search history.

(56) References Cited

U.S. PATENT DOCUMENTS

| 2002/0013948 A1* | 1/2002 | Aguayo et al. ............... 725/91 |
| 2002/0056123 A1* | 5/2002 | Liwerant et al. ............. 725/87 |
| 2003/0003899 A1* | 1/2003 | Tashiro et al. ............. 455/414 |
| 2003/0236905 A1* | 12/2003 | Choi et al. ................ 709/231 |
| 2004/0214551 A1* | 10/2004 | Kim ..................... 455/412.1 |

FOREIGN PATENT DOCUMENTS

| KR | 10-2002-0032745 | 5/2002 |
| KR | 10-2003-0001527 | 1/2003 |
| KR | 1020030012653 A | 2/2003 |
| WO | WO 02/19711 A1 | 3/2002 |

* cited by examiner

*Primary Examiner*—Patrick N Edouard
*Assistant Examiner*—Shantell Heiber
(74) *Attorney, Agent, or Firm*—Lee, Hong, Degerman, Kang & Waimey

(57) ABSTRACT

A method of reproducing multimedia contents in a mobile communication environment is provided. The method comprises configuring a first mobile terminal connected to at least a second mobile terminal in a communication network to download a content file from a remote content server; synchronizing the first mobile terminal with the second mobile terminal to download the content file in at least first and second segments; and downloading the first segment to the first mobile terminal and the second segment to the second mobile terminal.

20 Claims, 4 Drawing Sheets

SYSTEM FOR AND METHOD OF REPRODUCING MULTIMEDIA CONTENTS IN MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Patent Application No. 10-2003-51054, filed on Jul. 24, 2003 and 10-2003-78582, filed on Nov. 7, 2003, the content of which is hereby incorporated by reference herein in its entirety.

BACKGROUND OF THE INVENTION

1. Field of the Invention

The present invention relates to a system for and a method of reproducing multimedia contents in a mobile communication terminal and, more specifically, to a system for and a method of reproducing multimedia contents in a mobile communication terminal, wherein a user can download a multimedia file by synchronizing a plurality of mobile communication terminals positioned in a local area to deliver the multimedia file.

2. Description of the Related Art

IMT-2000 (International Mobile Telecommunications-2000) provides multimedia display capabilities for mobile communication terminals. Service charges for downloading multimedia content files using the mobile communication terminals are very high. Thus, downloading and watching a movie over a mobile communication terminal can be very expensive.

Streaming is a technique that involves receiving sounds and moving pictures in real time over the Internet. Multimedia contents such as audio and video can be reproduced in real time using streaming protocols such as RTSP (Real Time Streaming Protocol), RTP (Real time Transport Protocol), etc. RTSP is used to provide the streaming service in TCP/IP (Transmission Control Protocol/Internet Protocol) environment. RTP is used to provide streaming service in an UDP/IP (User Datagram Protocol/Internet Protocol) environment.

Respective servers for the RTP and RTSP communicate with mobile communication terminals, where RTP supports a one-way communication and RTSP supports a two-way communication. Users can implement functions such as video request, skip, pause, etc. through the RTSP.

The multimedia streaming provides for communicating multimedia data such as audio and video in real time over Internet. The multimedia data is successively communicated in packets instead of downloading entire content of a multimedia file.

The streaming services require a relatively large bandwidth. Therefore, the infrastructure and communicating parties need to support the required QoS (Quality of Service). Systems and methods are needed that can support the QoS requirements for streaming service in a mobile communication environment.

SUMMARY OF THE INVENTION

In accordance with one embodiment, a method of reproducing multimedia contents in a mobile communication environment is provided. The method comprises configuring a first mobile terminal connected to at least a second mobile terminal in a communication network to download a content file from a remote content server; synchronizing the first mobile terminal with the second mobile terminal to download the content file in at least first and second segments; and downloading the first segment to the first mobile terminal and the second segment to the second mobile terminal.

The first and second mobile terminals are connected in a wireless communication network. The content file is divided into a plurality of download segments for being downloaded to a plurality of mobile terminals synchronized in the mobile communication network to download the content file, the method further comprising determining size of each download segment based on number of the plurality of mobile terminals.

In one embodiment, start and end download positions are determined for each of the download segments, wherein each of the download segment is downloaded to a respective mobile terminal, the downloading starting with the start download position and ending with the download end position. The start and end download positions are determined by dividing total size of the content file (S) by the number of the plurality of mobile terminals (N) to determine size of each download segment.

The first and second segments are merged into a final file, once the downloading of the first and second segments is completed. The final file is stored in a memory of at least one of the first and second mobile terminals. The start and end download positions are included in a request submitted from a respective mobile terminal to the remote content server. In one embodiment, the downloading is performed over HTTP (Hyper Text Transfer Protocol). A GET command is used to implement the request.

In yet another embodiment, a method of reproducing multimedia contents in a mobile communication environment comprises configuring a first mobile terminal connected to at least a second mobile terminal in a communication network to download a content file from a remote content server; synchronizing the first mobile terminal with the second mobile terminal to download the content file in at least first and second segments; and streaming the first segment to the first mobile terminal and the second segment to the second mobile terminal.

The first and second mobile terminals are connected in a wireless communication network. A time for streaming each segment is determined based on number of mobile terminals synchronized in the mobile communication network to receive the content file and start and end streaming times are determined for streaming each segment, wherein streaming of each segment begins at the start streaming time and ends at the end streaming time.

In one embodiment, to determine start and end streaming times, total reproduction time of the content file (S) is divided by number of synchronized mobile terminals (N). The first and second segments merge into a final file, once the streaming of the first and second segments is completed. The final file is stored in a memory of at least one of the first and second mobile terminals.

The start and end streaming times are included in a request submitted from a respective mobile terminal to the remote content server. In one preferred embodiment, a PLAY command is used to implement the request over a real time streaming protocol (RTSP).

In one embodiment, a system for reproducing multimedia contents in a mobile communication network comprises a main mobile terminal for reproducing a content file received from a content server connected to the mobile communication network, wherein a plurality of sub-mobile terminals are synchronized with the main mobile terminal for reproducing the content file in accordance with reproduction data received by the main mobile terminal.

The content file is divisible into a plurality of content file segments, and the main mobile terminal and the plurality of sub-mobile terminals each determining start and end positions of the plurality of content file segments in accordance with size of the content file. The main mobile terminal and the plurality of sub-mobile terminals download the content file in a distributed manner by each of the sub-mobile terminals respectively downloading a corresponding content file segment. The mobile communication network is implemented over HTTP (Hyper Text Transfer Protocol), for example.

In yet another embodiment, a system for reproducing multimedia contents in a mobile communication network comprise a main mobile terminal for reproducing a content file received from a content server connected to the mobile communication network, wherein a plurality of sub-mobile terminals are synchronized with the main mobile terminal for reproducing a content file in accordance with reproduction data received by the main mobile terminal from a content server.

The reproduction data allows the main mobile terminal and the plurality of sub-mobile terminals each determining start and end streaming times for a plurality of content file segments in accordance with total reproduction time of the content file, whereby the main mobile terminal and the plurality of sub-mobile terminals stream the content file in a distributed manner by each of the sub-mobile terminals respectively streaming a corresponding content file segment according to start and end streaming times. The mobile communication network is implemented over RTSP (Real Time Streaming Protocol).

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1:
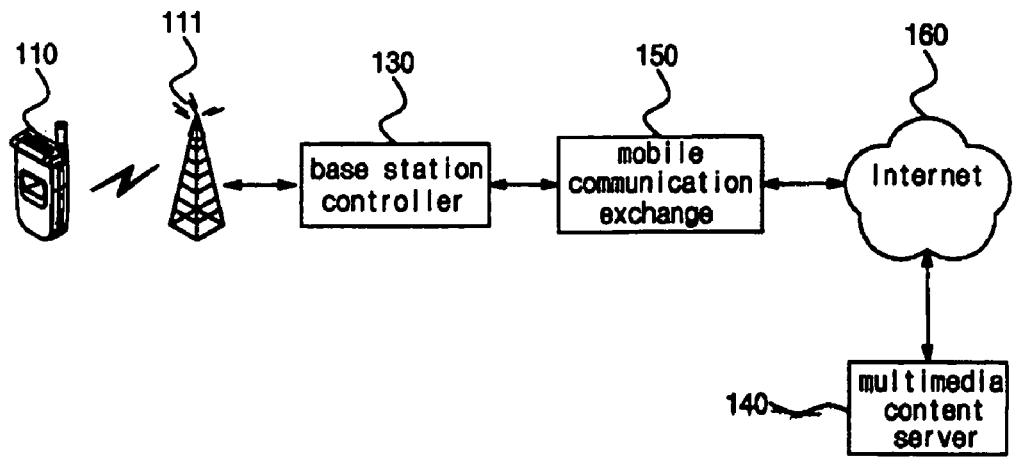
FIG. 1 is a block diagram illustrating a mobile communication system according to one embodiment of the present invention.
Figure 2:
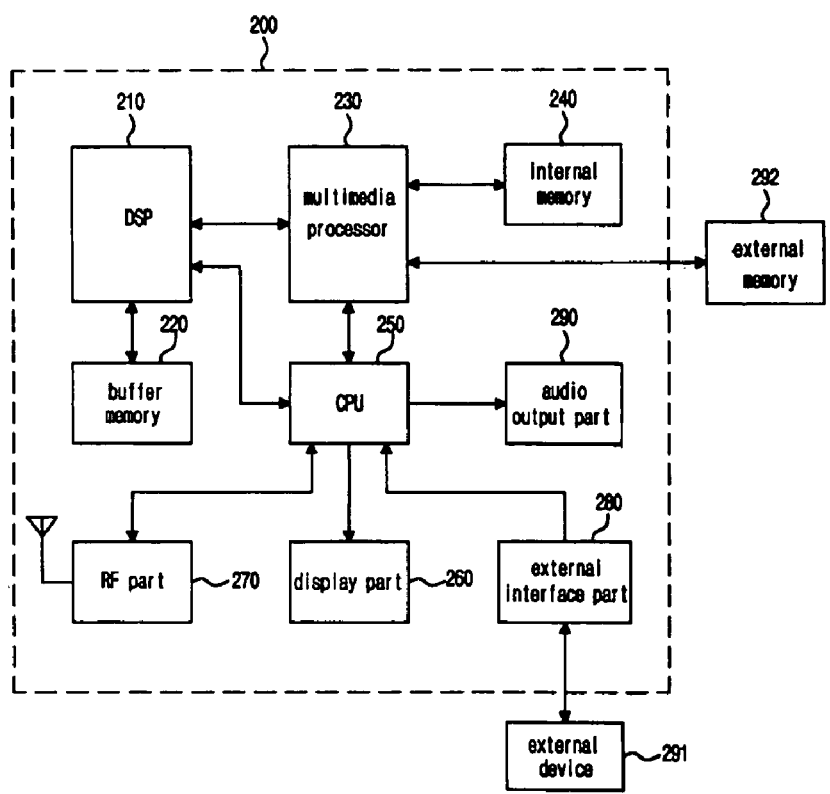
FIG. 2 is a block diagram illustrating an exemplary construction of a mobile communication terminal according to one embodiment of the present invention.

Referring to FIGS. 1 and 2, the mobile communication system in accordance with one embodiment of the invention comprises a multimedia content server 140, Internet 160, a mobile communication exchange 150, a base station controller 130, and a base station 111 connected in a networked environment. A plurality of (N) mobile communication terminals 110 are connected to the base station 111 through a wireless link, for example.

The multimedia content server 140 stores multimedia content files in a database and provides various multimedia content files including images and moving picture as requested by a mobile communication terminal 110. HTTP (Hyper Text Transfer Protocol) service is used for download content, for example.

In one embodiment, start and end positions of a desired content are specified in a "range" header in a GET command of the HTTP. The multimedia content server 140 transmits the multimedia content based on the identified range header starting from a first position through a download process.

In another embodiment, a streaming service is utilized to transmit multimedia content to a requesting mobile communication terminal. Time data of the multimedia content files are specified in a "range" header by using a reproduction method through streaming. Based on the specified time data, the multimedia content server 140 transmits the multimedia content file to the mobile communication terminals in accordance with the specified time data.

In one embodiment, RTSP (Real Time Streaming Protocol) is used for the streaming service. As such, start and end time points of a multimedia content file to be streamed can be specified in a "range" header by a PLAY command of the HTTP.

The mobile communication terminal 200 shown in FIG. 2 is connected to an external device 291, such as a multimedia content server or another mobile communication terminal, and can download or stream a multimedia file opened in the multimedia content server 140 and a caption format file corresponding thereto. A digital signal processor ("DSP") 210 of the mobile communication terminal 200 converts analog sound signals such as input voices into digital signals.

The digital signal processor 210 converts music files, into analog sound signals, and coverts sound data output from a radio frequency (RF) part ("RF part") 270 into analog sound signals. A buffer memory 220 temporarily stores data generated during operation of the DSP 210 and may employ RAM. The multimedia processor 230 decompresses the sampled audio signals in accordance with a predetermined protocol.

In one embodiment, an external interface part 280 is connected to the external device 291 through a local area communication network such as an infrared communication network (IrDA, IrFM). A Bluetooth communication network or a wireless LAN may be utilized in other embodiments. Signals and data are transmitted to the external device 291 and received from the external device 291, by way of external interface part 290.

The RF part 270 performs a communication function under predetermined control, and is wirelessly connected to the multimedia content server to transmit and receive multimedia files and data. A CPU 250 comprises ROM (flash memory), for example, for storing control and operation software. RAM for temporarily storing data generated during operation of mobile communication terminal 200.

The CPU 250 generally controls the streaming of data through the RF part 270, or the reproduction of the multimedia data such as image or music files stored in an external memory 292 or an internal memory 240. A display part 260 displays various states generated in the course of reproducing the image or music files in forms of characters or numerals under control of the CPU 250. An audio output part 290 serves as streaming the image or music files or amplifying and outputting the reproduced audio signals in an audible sound format under control of the CPU 250.

Figure 3:
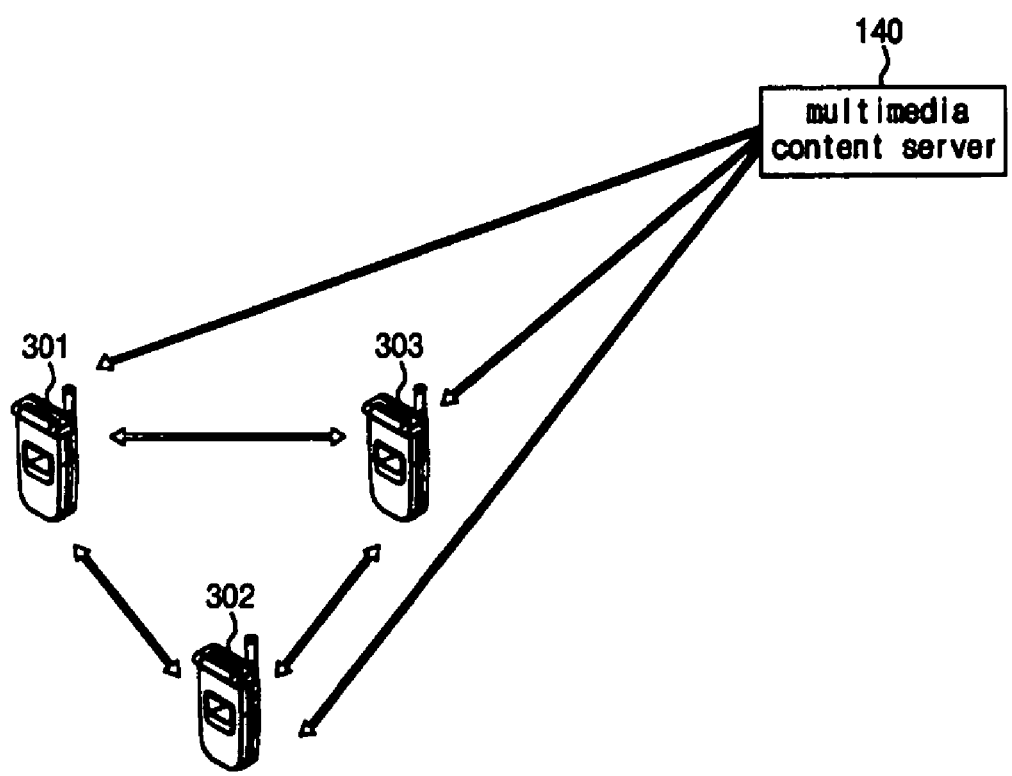
FIG. 3 is a block diagram illustrating a system for reproducing multimedia contents in a mobile communication terminal according to an embodiment of the present invention.
Figure 4:
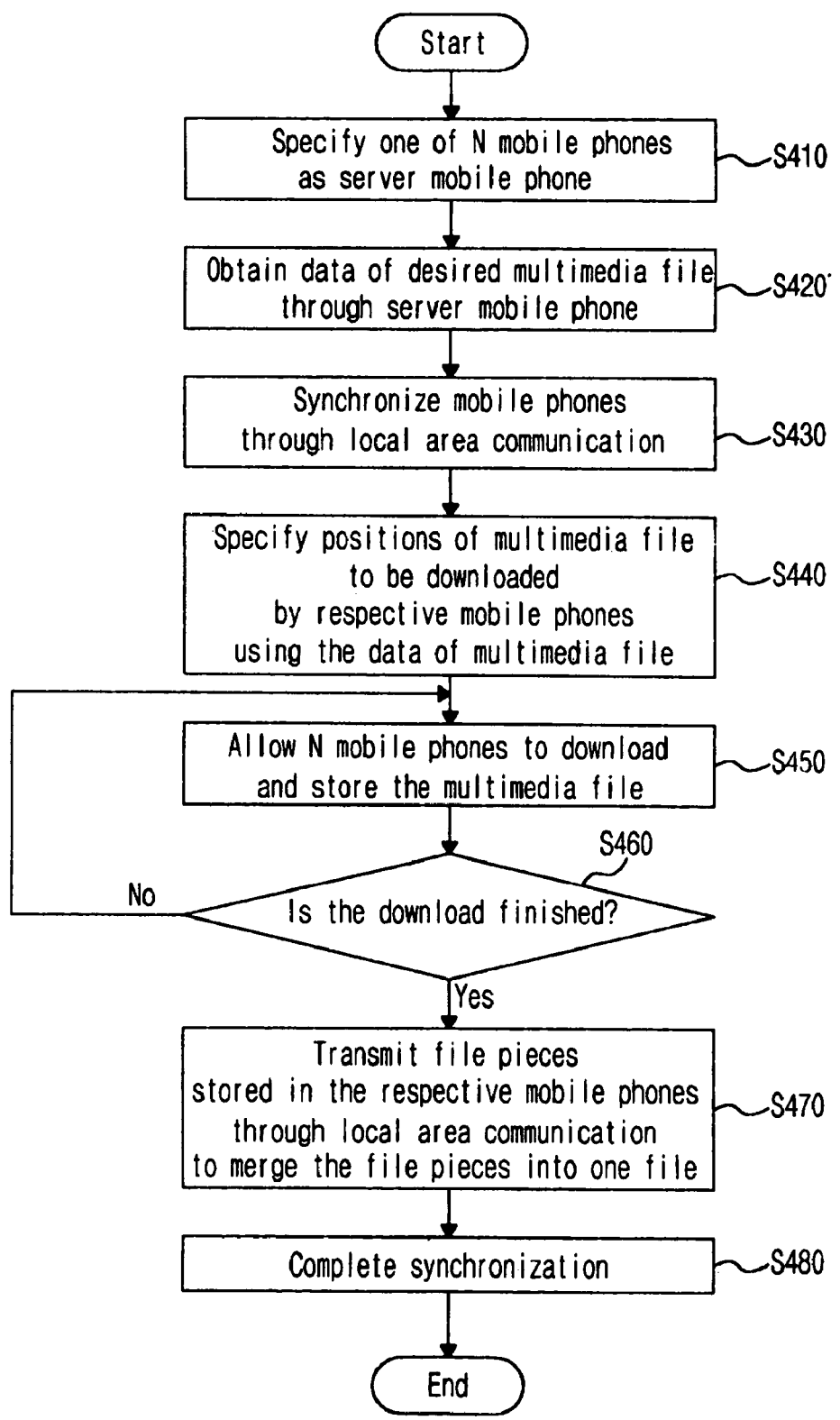
FIG. 4 is a flowchart of a method of downloading multimedia contents in a mobile communication terminal according to an embodiment of the present invention.

Referring to FIGS. 3 and 4, a plurality of N mobile communication terminals (e.g., 301, 302, 303) are provided. One of the N mobile communication terminals is specified as a server mobile communication terminal (S410). In this exemplary embodiment, the server mobile communication terminal 301 acquires content data through communication with the multimedia content server 140 (S420). The content data comprises the title of the content, the content server's URL, the file size, etc.

Thereafter, the server mobile communication terminal 301 synchronizes with other mobile communication terminals 302, 303, for example. This synchronization is to allow the plurality of mobile communication terminals to use a download service together through the local area communication network (S430). The synchronization may be performed by setting the respective mobile communication terminals to a reproduction mode based on data included in the multimedia content file provided through the local area communication network.

The local area communication network may be an infrared communication network (IrDA, IrFM), a Bluetooth communication network, a wireless LAN, implemented over wired or wireless technology. When the mobile communication terminals 301, 302, 303 are synchronized (S430), the server mobile communication terminal 301 divides a file size S of the content data by a total number of mobile communication terminals N (e.g., 3 in this embodiment). Based on this division download positions for the respective mobile communication terminals (the start and end positions) are calculated (S440).

For example, when the file size of the multimedia content is 3 Kbytes (6 packets), the respective positions are calculated such that the each mobile communication terminals 301, 302, 303 downloads 1 Kbytes (2 packets) of the multimedia file. Thus, N mobile communication terminals may independently download multiple segments of a multimedia file based on the calculated positions and store the downloaded segments (S450).

In one embodiment, for example, a first mobile communication terminal 301 divides the multimedia file having a file size of 3 Kbytes (e.g., 6 packets) into three segments having a size of 1 Kbytes (e.g., 2 packets) and downloads and stores the file segment corresponding to 1 Kbytes (0 to 1023 byte). A second mobile communication terminal 302 downloads and stores the file segment corresponding to the next 1 Kbytes (1024 to 2047 byte) and a third mobile communication terminal 303 downloads and stores the file segment corresponding to the next 1 Kbyte (2048 to 3071 byte).

The download is monitored to determine whether the respective mobile communication terminals 301, 302, 303 have finished the download of the corresponding file segment (S460). When it is determined that the download is completed, the file segments downloaded and stored in the respective mobile communication terminal are transmitted to the requesting mobile communication terminal (e.g., the server mobile communication terminal) to merge the multiple file segments into one multimedia file (S470).

In one embodiment, the server mobile communication terminal 301 and the second mobile communication terminal 302 exchange the respective file segments. The first file segment including the first 1 Kbytes (0 to 1023 byte) downloaded by the first mobile communication terminal 301 and the second file segment including the second 1 Kbytes (1024 to 2047 byte) downloaded by the second mobile communication terminal 302 are exchanged and merged.

The server mobile communication terminal 301 stores the merged first and second file segments (0 to 2047 byte). In one embodiment, the second mobile communication terminal 302 also stores the merged first and second file segments of 2 Kbytes (0 to 2047 byte). Then, the server mobile communication terminal 301 and the third mobile communication terminal 303 exchange the third file segments stored by the respective mobile communication terminals and so on.

That is, the merged file segments of 2 Kbytes (0 to 2047 byte) stored in the first mobile communication terminal 301 and the third file segment of 1 Kbytes (2048 to 3071 byte) downloaded by the third mobile communication terminal 303 are exchanged, and merged by each of the first and third mobile communication terminals 301, 303.

In one embodiment, the server mobile communication terminal 301 stores the file segments of 3 Kbytes (0 to 3071 byte), and the third mobile communication terminal 303 also stores the merged file segments of 3 Kbytes (0 to 3071 byte). The second mobile communication terminal 302 receives the file segments from the first mobile communication terminal 301 or the third mobile communication terminal 303.

In one embodiment, the second mobile communication terminal 302 also stores the merged file segments of 3 Kbytes (0 to 3071 byte). Thus, all the mobile communication terminals 301, 302, 303 store the file segments of 3 Kbytes (0 to 3071 byte) merged into a single file.

When the download operation is completed, the server mobile communication terminal 301 notifies, for example, all the mobile communication terminals of end of the distributed download of a file, and synchronization is completed (S480). In the above exemplary embodiment, where three mobile communication terminals receive and store one multimedia file through download, the reception burden is distributed between 3 phones.

Accordingly, data is exchanged between N mobile communication terminals through a local area communication network connecting the N mobile communication terminals. Depending on implementation, the mobile communication terminals may be connected over a wired or wireless communication network or a combination of the two.

Figure 5:
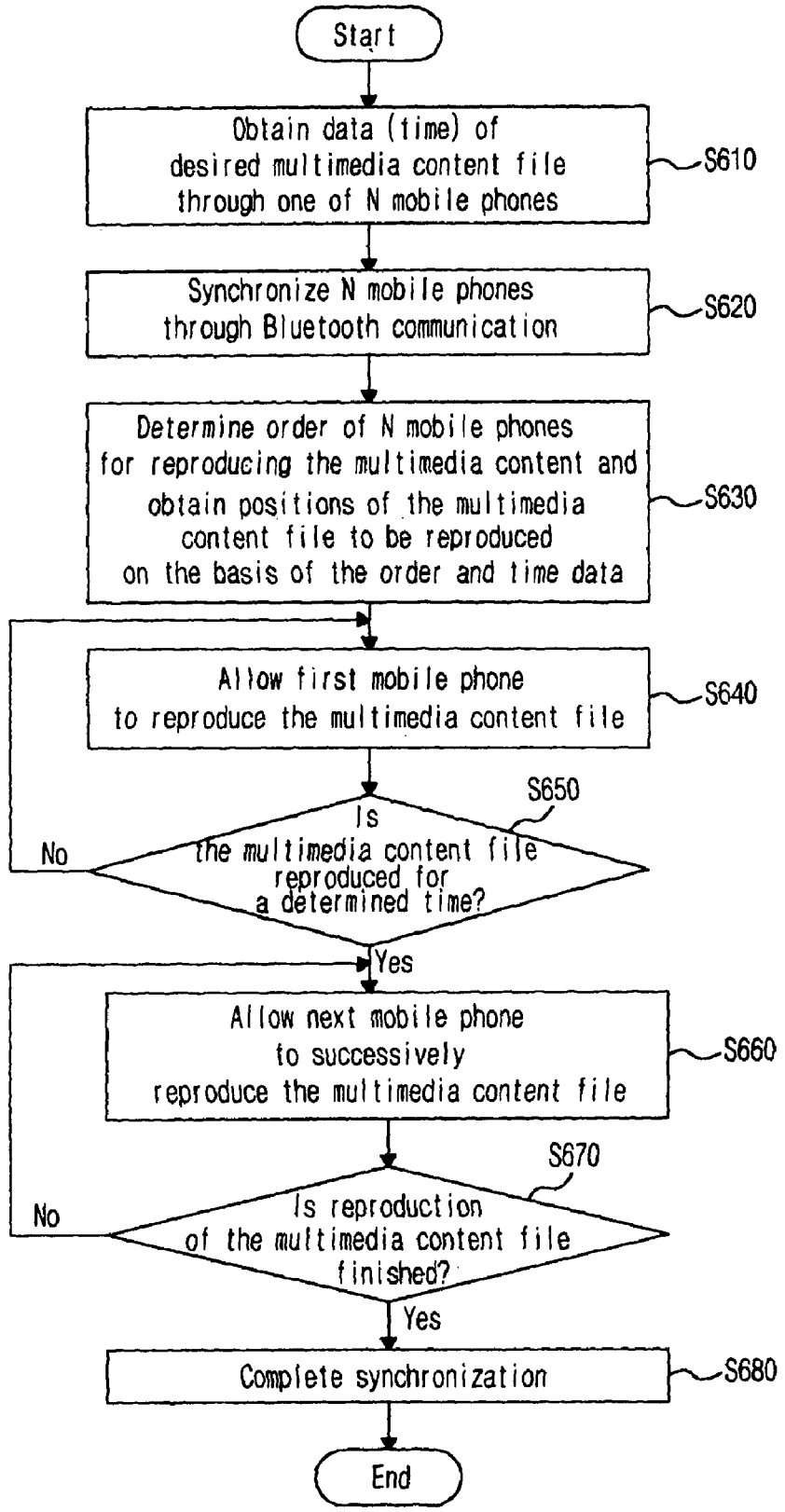
FIG. 5 is a flowchart of a method of streaming multimedia contents in a mobile communication terminal according to another embodiment of the present invention.

Referring to FIG. 5, in another embodiment, a time estimate for reproducing multimedia content file is acquired from the multimedia content server 140 by a first mobile communication terminal (S610). The first mobile communication terminal may act as a server terminal connected to N−1 other mobile communication terminals in a wired or wireless communication network.

The N mobile communication terminals in the network, are synchronized to exchange data using a data streaming service (S620). The synchronization may be performed by setting the respective mobile communication terminals to a reproduction mode in accordance with the reproduction data for the multimedia file through a local area communication network.

In one embodiment, an order of the N mobile communication terminals for using the streaming service is determined. Time data is estimated by dividing the total time for reproduction by N and then positions of the multimedia content file to be reproduced by each mobile communication terminal are obtained using the average time data (S630).

In one embodiment, a multimedia content file is reproduced by the first mobile communication terminal based on the estimated time (S640). Then, it is determined whether the first mobile communication terminal has finished the reproduction of the multimedia content file for a first determined time (S650). If it is determined that the first mobile communication terminal has not finished the reproduction, the multimedia content file is reproduced (S640).

When it is determined that the first mobile communication terminal has finished the reproduction, the next mobile communication terminal is allowed to successively reproduce the multimedia content file (S660). It is then determined whether the next mobile communication terminal has finished the reproduction of the multimedia content file for a second determined time (S670).

When it is determined that the next mobile communication terminal does has finished the reproduction, another mobile communication terminal successively reproduces the multimedia content file. When the Nth mobile communication terminal completes the reproduction of the multimedia content file for an Nth determined time, the synchronization is also completed (S680).

As such, when a user of a mobile communication terminal receives and watches data such as a moving picture, the reception burden is distributed among N mobile communication terminals, instead of the receiving mobile communication terminal. In one embodiment, the synchronization of the mobile communication terminals may end before the Nth mobile communication terminal finishes reproduction.

In one embodiment of the present invention, a plurality of mobile communication terminals (N) are networked are synchronized to divide a multimedia file into multimedia file segments and then merged into one file. Thus, it is possible to receive a multimedia file where each phone receives a portion (1/N) of the entire multimedia file.

The plurality of mobile communication terminals thus process the multimedia content file at a lower communication burden and cost. As such, the time for downloading or streaming a multimedia file through a wireless network by using mobile communication terminals is reduced to 1/N. Accordingly, the download speed or the streaming speed can be increased by N times.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method of reproducing multimedia contents downloaded in a mobile communication network, the method comprising:
   configuring a first mobile terminal in the mobile communication network to download a content file from a remote content server;
   dividing the content file into at least first and second segments;
   synchronizing the first mobile terminal with at least a second mobile terminal in the mobile communication network to download the first and second segments, respectively; and
   downloading the first segment to the first mobile terminal and the second segment to the second mobile terminal.

2. The method of claim 1, wherein the first and second mobile terminals are connected in a wireless communication network.

3. The method of claim 1, wherein the content file is divided into a plurality of download segments for being downloaded to a plurality of mobile terminals synchronized in the mobile communication network to download the content file, the method further comprising:
   determining size of each download segment based on number of the plurality of mobile terminals.

4. The method of claim 3 wherein the determining comprises:
   dividing total size of the content file (S) by the number of the plurality of mobile terminals (N) to determine size of each download segment.

5. The method of claim 3, further comprising:
   determining staff and end download positions for each of the download segments, wherein each of the download segment is downloaded to a respective mobile terminal, the downloading starting with the start download position and ending with the download end position.

6. The method of claim 5, wherein start and end download positions are included in a request submitted from a respective mobile terminal to the remote content server.

7. The method of claim 6, wherein the downloading is performed over HTTP (Hyper Text Transfer Protocol), and wherein a PLAY command is used to implement the request.

8. The method of claim 6, wherein the downloading is performed over HTTP (Hyper Text Transfer Protocol), and wherein a GET command is used to implement the request.

9. The method of claim 1, further comprising:
   merging the first and second segments into a final file, once the downloading of the first and second segments is completed.

10. The method of claim 9, further comprising:
    storing the final file in a memory of at least one of the first and second mobile terminals.

11. A method of reproducing multimedia contents streamed in a mobile communication network, the method comprising:
    configuring a first mobile terminal in the mobile communication network to stream a content file from a remote content server;
    dividing the content file into at least first and second segments;
    synchronizing the first mobile terminal with at least a second mobile terminal in the mobile communication network to stream the first and second segments; and
    streaming the first segment to the first mobile terminal and the second segment to the second mobile terminal.

12. The method of claim 11, wherein the first and second mobile terminals are connected in a wireless communication network.

13. The method of claim 11, further comprising:
determining a time for streaming each segment based on number of mobile terminals synchronized in the mobile communication network to receive the content file.

14. The method of claim 13 wherein the determining comprises:
dividing total reproduction time of the content file (S) by number of synchronized mobile terminals (N).

15. The method of claim 13, further comprising:
start and end streaming times for streaming each segment, wherein streaming of each segment begins at the start streaming time and ends at the end streaming time.

16. The method of claim 15, wherein the start and end streaming times are included in a request submitted from a respective mobile terminal to the remote content server.

17. The method of claim 16, wherein a PLAY command is used to implement the request over a real time streaming protocol (RTSP).

18. The method of claim 11, further comprising:
merging the first and second segments into a final file, once the streaming of the first and second segments is completed.

19. The method of claim 18, further comprising:
storing the final file in a memory of at least one of the first and second mobile terminals.

20. The method of claim 11, wherein the streaming is performed over a real time streaming protocol (RTSP).

* * * * *